US011015003B2

United States Patent
Hjärtfors et al.

(10) Patent No.: US 11,015,003 B2
(45) Date of Patent: May 25, 2021

(54) JACKET WITH IMPROVED PROPERTIES

(71) Applicant: BOREALIS AG, Vienna (AT)

(72) Inventors: Anna Hjärtfors, Kungälv (SE); Yi Liu, Engerwitzdorf (AT); Ravindra Tupe, Porvoo (FI); Victor Sumerin, Helsinki (FI)

(73) Assignee: Borealis AG, Vienna (AT)

( * ) Notice: Subject to any disclaimer, the term of this patent is extended or adjusted under 35 U.S.C. 154(b) by 16 days.

(21) Appl. No.: 16/301,196

(22) PCT Filed: May 29, 2017

(86) PCT No.: PCT/EP2017/062883
§ 371 (c)(1),
(2) Date: Nov. 13, 2018

(87) PCT Pub. No.: WO2017/207483
PCT Pub. Date: Dec. 7, 2017

(65) Prior Publication Data
US 2019/0144582 A1 May 16, 2019

(30) Foreign Application Priority Data
May 31, 2016 (EP) ..................................... 16172202

(51) Int. Cl.
*C08F 210/16* (2006.01)
*H01B 3/44* (2006.01)
(Continued)

(52) U.S. Cl.
CPC ............ *C08F 210/16* (2013.01); *C08F 2/001* (2013.01); *C08K 3/04* (2013.01); *C08L 23/0815* (2013.01);
(Continued)

(58) Field of Classification Search
None
See application file for complete search history.

(56) References Cited

U.S. PATENT DOCUMENTS

| 3,242,150 A | 3/1966 | Scoggin |
| 3,324,093 A | 6/1967 | Allenman |

(Continued)

FOREIGN PATENT DOCUMENTS

| EP | 188125 | 7/1986 |
| EP | 250169 | 6/1987 |

(Continued)

OTHER PUBLICATIONS

Office Action for European Patent Application No. 16172202.0 dated Dec. 11, 2019, 5 pages.
(Continued)

*Primary Examiner* — Richard A Huhn
(74) *Attorney, Agent, or Firm* — Lowenstein Sandler LLP

(57) ABSTRACT

The present invention relates to a multimodal ethylene copolymer composition having a density of 920 to 949 kg/m³ and a flexural modulus, wherein said flexural modulus is following the equation: Flexural modulus [MPa]<21.35·density [kg/m3]−19585 [1]. The multimodal ethylene copolymer composition according to the invention can be used in a highly flexible cable jacket, preferably a power cable jacket.

13 Claims, 1 Drawing Sheet

(51) Int. Cl.
*C08L 23/08* (2006.01)
*C08F 2/00* (2006.01)
*C08K 3/04* (2006.01)

(52) U.S. Cl.
CPC .......... *H01B 3/441* (2013.01); *C08F 2500/05* (2013.01); *C08L 2203/202* (2013.01)

(56) References Cited

U.S. PATENT DOCUMENTS

| | | | |
|---|---|---|---|
| 3,374,211 | A | 3/1968 | Marwil et al. |
| 3,405,109 | A | 10/1968 | Rohlfing |
| 4,532,311 | A | 7/1985 | Fulks et al. |
| 4,543,399 | A | 9/1985 | Jenkins, III et al. |
| 4,578,879 | A | 4/1986 | Yokoyama et al. |
| 4,582,816 | A | 4/1986 | Miro |
| 4,621,952 | A | 11/1986 | Aronson |
| 4,803,251 | A | 2/1989 | Goode et al. |
| 4,855,370 | A | 8/1989 | Chirillo et al. |
| 4,933,149 | A | 6/1990 | Rhee et al. |
| 5,026,795 | A | 6/1991 | Hogan |
| 5,391,654 | A | 2/1995 | Ahvenainen et al. |
| 2011/0253418 | A1* | 10/2011 | Ek ..................... C08F 210/16 174/110 PM |
| 2011/0290529 | A1 | 12/2011 | Pakkanen et al. |

FOREIGN PATENT DOCUMENTS

| | | |
|---|---|---|
| EP | 376936 | 7/1990 |
| EP | 424049 | 10/1990 |
| EP | 499759 | 2/1991 |
| EP | 655073 | 5/1991 |
| EP | 460594 | 6/1991 |
| EP | 479186 | 9/1991 |
| EP | 560035 | 1/1993 |
| EP | 614467 | 6/1993 |
| EP | 579426 | 7/1993 |
| EP | 600414 | 11/1993 |
| EP | 696293 | 11/1994 |
| EP | 684871 | 12/1994 |
| EP | 699213 | 12/1994 |
| EP | 707513 | 1/1995 |
| EP | 721798 | 7/1996 |
| EP | 892979 | 10/1997 |
| EP | 891990 | 1/1999 |
| EP | 907682 | 4/1999 |
| EP | 1310295 | 5/2003 |
| EP | 1415999 | 5/2004 |
| EP | 1591460 | 11/2005 |
| EP | 2182525 | 5/2010 |
| EP | 2351049 | 5/2010 |
| EP | 2353169 | 5/2010 |
| EP | 2746300 | 6/2014 |
| EP | 3009457 | 4/2016 |
| EP | 3109261 B1 | 12/2018 |
| RU | 2220467 C2 | 12/2003 |
| WO | WO9425495 | 11/1994 |
| WO | WO1994027134 | 11/1994 |
| WO | WO1996035936 | 5/1996 |
| WO | WO9619503 | 6/1996 |
| WO | WO9632420 | 10/1996 |
| WO | WO9703124 | 1/1997 |
| WO | WO0029452 | 11/1999 |
| WO | WO0026258 | 5/2000 |
| WO | WO0105845 | 1/2001 |
| WO | WO2005087361 | 9/2005 |
| WO | WO2007025640 | 3/2007 |
| WO | 2011023440 A1 | 3/2011 |

OTHER PUBLICATIONS

English Translation of Office Action for Russian Application No. 2018144361 dated Aug. 30, 2019, 4 pages.
Office Action for Indian Patent Application No. 201817047423 dated Dec. 26, 2019, 5 pages.
First Examination Report for New Zealand Patent Application No. 747906 dated Jul. 29, 2019, 4 pages.
Klimke, K, Parkinson, M., Piel, C., Kaminsky, W., Spiess, H.W., Wilhelm, M., Macromol. Chem. Phys. 2006, 207:382.
Parkinson, M., Klimke, K., Spiess, H.W., Wilhelm, M., Macromol. Chem. Phys. 2007, 208:2128.
Pollard, M., Klimke, K., Graf, R., Spiess, H.W., Wilhelm, M., Sperber, O., Piel, C., Kaminsky, W., Macromolecules 2004, 37:813.
Filip, X., Tripon, C., Filip, C., J. Mag. Resn. 2005, 176, 239.
Griffin, J.M., Tripon, C., Sampson, A., Filip, C., and Brown, S.P., Mag. Res. in Chem. 2007 45, S1, S198.
Castignolles, P., Graf, R., Parkinson, M., Wilhelm, M., Gaborieau, M., Polymer 50 (2009) 2373.
Busico, V., Cipullo, R., Prog. Polym. Sci. 26 (2001) 443.
Busico, V., Cipullo, R., Monaco, G., Vacatello, M., Segre, A.L., Macromoleucles 30 (1997) 6251.
Zhou, Z., Kuemmerle, R., Qiu, X., Redwine, D., Cong, R., Taha, A., Baugh, D. Winniford, B., J. Mag. Reson. 187 (2007) 225.
Busico, V., Carbonniere, P., Cipullo, R., Pellecchia, R., Severn, J., Talarico, G., Macromol. Rapid Commun. 2007, 28, 1128.
Resconi, L, Cavallo, L, Fait, A., Piemontesi, F., Chem. Rev. 2000, 100, 1253.
International Search Report and Written Opinion for International Application No. PCT/EP2017/862883 dated Aug. 10, 2017, 11 pages.
English Translation of Office Action for Chinese Patent Application No. 201780028963.4 dated Mar. 19, 2020, 5 pages.
Vasile, Cornelia, et al., "Practical Guide to Polyethylene", Rapra Technology Limited, 2005, 60 pages.

\* cited by examiner

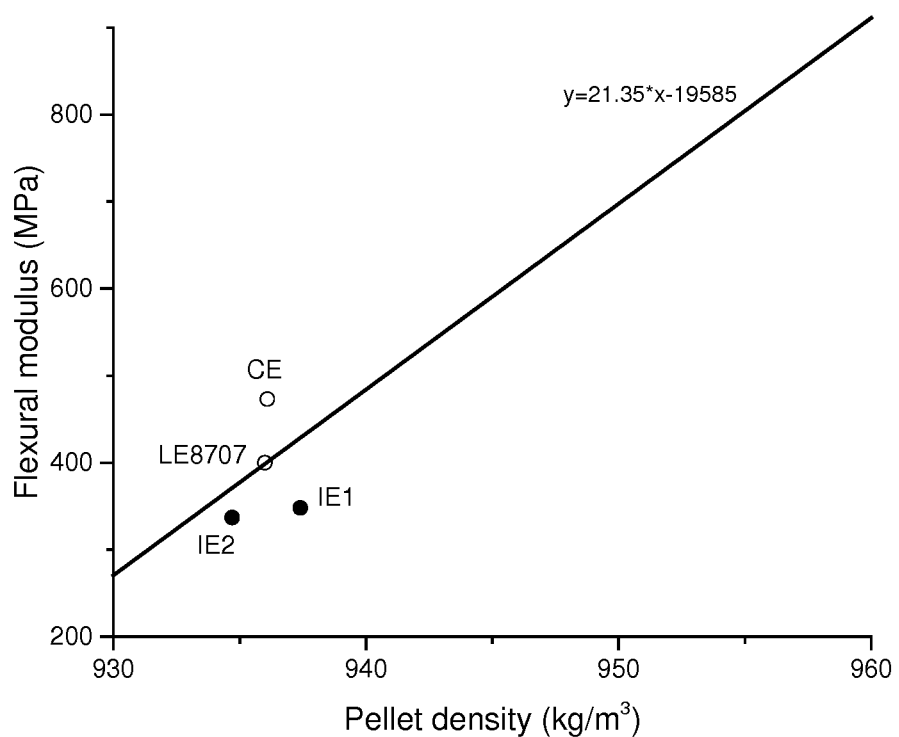

JACKET WITH IMPROVED PROPERTIES

CROSS-REFERENCE TO RELATED APPLICATIONS

This application is a national phase entry under 35 U.S.C. § 371 of International Application No. PCT/EP2017/062883, filed on May 29, 2017, which claims the benefit of priority of European Patent Application No. 16172202.0, filed on May 31, 2016. The contents of these applications are hereby incorporated by reference herein in their entirety.

FIELD OF THE INVENTION

The invention relates to a multimodal ethylene copolymer composition having a density of 920 to 949 kg/m$^3$ and a flexural modulus. The multimodal ethylene copolymer composition according to the present invention can be used in a cable jacket.

BACKGROUND OF THE INVENTION

A typical cable generally comprises a conductor that is surrounded by one or more layers depending on the application area. For instance, a power cable has several layers of polymeric materials including an inner semiconducting layer, followed by an insulating layer, and then an outer semiconducting layer. To these layers, one or more further auxiliary layer(s) may be added.

The outer protecting polymeric layer is known as a jacketing layer. Other types of cables are communication cables that also comprise several layers and a jacketing layer.

One of the targets for development of polyethylene materials has been to maximize flexibility while maintaining other mechanical properties, e.g. high Shore D for linear low density polyethylene (LLDPE) jacketing layer applications.

Since the outer jacketing layer provides outer protection of the cable, it plays an important role in providing functionality. Safety, reliability and long-term functioning are important key factors required for jacketing applications. On the other hand, jacketing layer has a big impact on the overall flexibility of the cable. Thus, flexibility of the jacket layer is the most important factor for obtaining a flexible cable. Flexible cables are easy to handle and to install, especially in buildings and conduits.

Linear low density polyethylene (LLDPE) is known i.a. as a jacketing layer material. The mechanical properties of a jacketing layer can be improved by using polyethylene having higher density, such as high density polyethylene (HDPE) polymers. HDPE polymers provide i.a. improved mechanical strength and abrasion resistance to a cable layer. However, HDPE has a disadvantage of limited flexibility.

Multimodal jacket ethylene polymer compositions are well known in prior art, such as EP907682 B1 and EP892979 B1. EP2353169, EP2351049 and EP2182525 disclose flexible polyethylene compositions for cable jacket produced with a single site catalyst.

There is a continuous need in the polymer field to find polymers which are suitable for demanding applications, particularly for W&C applications, where the cable materials must meet high requirements and stringent authority regulations.

In the area of cable jacketing, there is a particular need to provide a material combining high flexibility with high mechanic strength.

The object of the present invention is thus to provide a bimodal jacket with improved flexibility in relation to density, while maintaining processability, i.e. maintaining MFR properties.

It is a further object of the present invention to achieve Shore D (1s) values at a higher, or at least a similar level. Shore D gives an indication of the hardness of the material. This parameter is especially important for subterrestrial installations, where the cable is subjected to rather harsh conditions.

SUMMARY OF THE INVENTION

Definitions

By "multimodal copolymer" is meant a copolymer which contains distinct components having different average molecular weights or different contents of comonomer or both. A multimodal copolymer is produced by copolymerizing ethylene and a comonomer in two or more polymerization stages, where the polymerization conditions are sufficiently different to allow production of different polymers in different stages. Alternatively, a multimodal copolymer may be produced in a single polymerization stage by using two or more different catalysts or by using a multi-component catalyst comprising compounds of at least two different transition metals.

By "continuously operating process" is meant a process or a process stage into which the feedstock materials are continuously or intermittently introduced and from which the product is continuously or intermittently withdrawn. By continuous addition or withdrawal is meant that an uninterrupted stream goes in or flows out of the process or process stage. By intermittent addition or withdrawal is meant that during the operation of the process small batches of raw material are constantly added into or small batches of product are constantly withdrawn from the process or process stage. The cycle time between such batches is small compared to the overall average residence time of the process or process stage, such as not more than 10% of the overall average residence time.

By "fluid reaction mixture" is meant the fluid phase (liquid, gas or supercritical) in which the reactants (ethylene, comonomer and hydrogen) are dissolved. The particles comprising the catalyst and polymer are then suspended in the fluid reaction mixture.

The term "cable" covers all type of wires and cables used in the wire and cable (W&C) applications, such as power cables and communication cables.

The invention is a multimodal ethylene copolymer composition with a density of 920 and 949 kg/m$^3$, wherein the flexural modulus is following the equation:

$$\text{Flexural modulus [MPa]} < 21.35 \cdot \text{density[kg/m}^3\text{]} - 19585 \quad [1]$$

The multimodal ethylene copolymer composition according to the invention has an optimal compromise between high flexibility and advantageous mechanical properties.

The solid catalyst component used in copolymerization of ethylene is a solid Ziegler-Natta catalyst component for ethylene polymerization, which solid Ziegler-Natta catalyst component comprises magnesium, titanium, halogen and an internal organic compound. The internal organic compound (donor) is selected from bi-(oxygen containing ring) compounds of formula (I) or isomers or mixtures therefrom

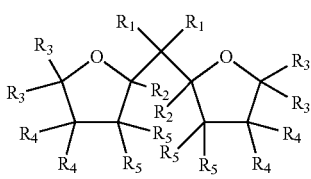

(I)

wherein in the formula (I) $R_1$ to $R_5$ are same or different and can be hydrogen, a linear or branched $C_1$ to $C_8$-alkyl group, or a $C_3$-$C_8$-alkylene group, or two or more of $R_1$ to $R_5$ can form a ring, and the two oxygen-containing rings are individually saturated or partially unsaturated or unsaturated. By "isomers and mixtures" is meant all possible stereoisomers and mixture that may be derivable from a structure of formula (I) depending on the substituents $R_1$ to $R_5$.

The catalyst used in the present invention comprises a component supported on solid $MgCl_2$ which is prepared by a method comprising the steps of:
 a) providing solid carrier particles of $MgCl_2$*mROH adduct
 b) pre-treating the solid carrier particles of step a) with a compound of Group 13 metal
 c) treating the pre-treated solid carrier particles of step b) with a transition metal compound of Group 4 to 6
 d) recovering the solid catalyst component,
wherein the solid carrier particles are contacted with an internal organic compound of formula (I) or isomers or mixtures therefrom before treating the solid carrier particles in step c) and wherein in the formula (I) or isomers or mixtures therefrom $R_1$ to $R_5$ are same or different and can be hydrogen, a linear or branched $C_1$ to $C_8$-alkyl group, or a $C_3$-$C_8$-alkylene group, or two or more of $R_1$ to $R_5$ can form a ring, and the two oxygen-containing rings are individually saturated or partially unsaturated or unsaturated, and wherein R in the adduct $MgCl_2$*mROH is a linear or branched alkyl group with 1 to 12 C atoms, and m is 0 to 6.

Accordingly, the internal organic compound of formula (I) is contacted with the solid carrier particles before treatment of solid carrier particles with the transition metal compound of Group 4 to 6. Thus, the internal organic compound can be contacted with the solid carrier particles before step b), i.e. before pre-treating the solid carrier particles with Group 13 metal compound, or simultaneously with said pre-treatment step, or after step b), but before treating the solid carrier particles with the transition metal compound of Group 4 to 6.

According to the present invention, the catalyst is used in accordance to what was disclosed above in the process for producing linear low density polyethylene in a multistage process.

BRIEF DESCRIPTION OF THE DRAWINGS

FIG. 1 illustrates flexural modulus as a function of pellet density in accordance with an embodiment of the present invention.

DETAILED DESCRIPTION

The catalyst will be described in the following in greater detail. As used herein, the term Ziegler Natta (ZN) catalyst component is intended to cover a catalyst component comprising a transition metal compound of Group 4 to 6, a compound of a metal of Group 13 of the Periodic Table (IUPAC, Nomenclature of Inorganic Chemistry, 1989) and an internal organic compound supported on $MgCl_2$ based carrier.

Magnesium dihalide is used as a starting material for producing a carrier. The solid carrier is a carrier where alcohol is coordinated with Mg dihalide, preferably $MgCl_2$. The $MgCl_2$ is mixed with an alcohol (ROH) and the solid carrier $MgCl_2$*mROH is formed according to well-known methods. As examples, spray drying or spray crystallisation methods can be used to prepare magnesium halide. Spherical and granular $MgCl_2$*mROH carrier materials of different sizes (5-100 μm) are suitable to be used in the present invention. The alcohol in producing $MgCl_2$*mROH carrier material is an alcohol ROH, where R is a linear or branched alkyl group containing 1 to 12 carbon atoms, preferably 1 to 8 carbon atoms, more preferably 1 to 4 carbon atoms. Ethanol is typically used. In $MgCl_2$*mROH, m is from 0 to 6, preferably from 1 to 4, more preferably from 2.7 to 3.3.

$MgCl_2$*mROH is available from commercial sources or can be prepared by methods described in prior art. Preparation methods of $MgCl_2$*mROH carrier is described in several patents e.g. in EP-A-376936, EP-A-424049, EP-A-655073 and EP-A-614467.

Group 13 metal compound, used in step b) is preferably an aluminum compound.

Particularly preferably the aluminum compound is an aluminum compound of the formula $Al(alkyl)_xX_{3-x}$, wherein each alkyl is independently an alkyl group of 1 to 12 carbon atoms, preferably 1 to 8 carbon atoms, more preferably 1 to 6 carbon atoms, X is halogen, preferably chlorine, and $1<x<3$. The alkyl group can be linear, branched or cyclic, or a mixture of such groups.

Preferred aluminum compounds are dialkyl aluminum chlorides or trialkyl aluminum compounds, for example dimethyl aluminum chloride, diethyl aluminum chloride, di-isobutyl aluminum chloride, and triethylaluminum or mixtures therefrom. Most preferably the aluminum compound is a trialkyl aluminum compound, especially triethylaluminum compound.

The transition metal compound of Group 4 to 6 is preferably a Group 4 transition metal compound or a vanadium compound, more preferably a titanium compound. Particularly preferably the titanium compound is a halogen-containing titanium compound of the formula $X_yTi(OR^8)_{4-y}$, wherein $R^8$ is a $C_{1-20}$ alkyl, preferably a $C_{2-10}$ and more preferably a $C_{2-8}$ alkyl group, X is halogen, preferably chlorine, and y is 1, 2, 3 or 4, preferably 3 or 4 and more preferably 4.

Suitable titanium compounds include trialkoxy titanium monochlorides, dialkoxy titanium dichloride, alkoxy titanium trichloride and titanium tetrachloride. Preferably titanium tetrachloride is used.

The internal organic compound is selected from bi-cyclic ether compounds of formula (I) or isomers or mixtures therefrom:

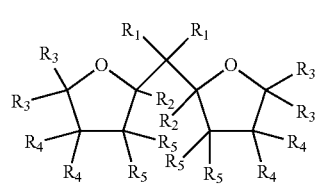

(I)

wherein in formula (I) $R_1$ to $R_5$ are same or different and can be hydrogen, a linear or branched $C_1$ to $C_8$-alkyl group, or a $C_3$-$C_8$-alkylene group, or two or more of $R_1$ to $R_5$ can form a ring, and the two oxygen-containing rings are individually saturated or partially unsaturated or unsaturated.

Examples of preferred linear or branched $C_1$ to $C_8$-alkyl groups are methyl, ethyl, n-propyl, iso-propyl, n-butyl, sec-butyl, tert-butyl, pentyl and hexylgroups.

Examples of preferred $C_3$-$C_8$-alkylene groups are pentylene and butylene groups.

The two $R_1$ are preferably the same and are linear $C_1$ to $C_4$-alkyl groups, more preferably methyl or ethyl, most preferably both $R_1$ are methyl; or the two $R_1$ form a ring with the carbon atom they are attached to, preferably a ring with 3 to 7 carbon atoms, more preferably cyclopentyl or cyclohexyl ring.

$R_2$ to $R_5$ are the same or different and are preferably H or a $C_1$ to $C_2$-alkyl groups, or two or more of $R_2$ to $R_5$ residues can form a ring. If one or more rings are formed by the residues $R_2$ to $R_5$, these are more preferably formed by $R_3$ and $R_4$ and/or $R_4$ and $R_5$.

Preferably the residues $R_2$ to $R_5$ do not form rings and more preferably at most two of the residues $R_2$ to $R_5$ are methyl, the others are H. Most preferably $R_2$ to $R_5$ are all hydrogens.

Both oxygen-containing rings may be saturated or partially unsaturated or unsaturated. Each partially unsaturated or unsaturated oxygen-containing ring can have one or two double bonds. More preferably both oxygen-containing rings are saturated.

In the most preferred embodiment, 2,2-di(2-tetrahydrofuryl)propane (DTHFP) is used with the isomers thereof. DTHFP is typically a 1:1 mol/mol diastereomeric mixture of D,L-(rac)-DTHFP and meso-DTHFP.

When producing the supported catalyst component used in the present invention, it is especially preferred that the internal organic compound, as defined above, is added to the catalyst mixture before, during or after the pre-treating of the $MgCl_2$*mROH with the Group 13 metal compound, but before treating it with the compound of a transition metal of Group 4 to 6.

Thus, according to the present invention, the solid catalyst component may be prepared by a process comprising the steps of:
i) providing solid $MgCl_2$*mROH carrier, wherein m is 1 to 4 and R is a linear or branched alkyl group containing 1 to 8 C atoms
ii) pre-treating the solid carrier particles of step i) with an Al compound
iii) adding the internal organic compound of formula (I) into the pre-treated solid carrier of step ii) or
iii') simultaneously with step ii) adding the internal organic compound of formula (I) into the solid carrier
iv) treating the pre-treated solid carried particles of step iii) or iii') with $TiCl_4$ and
v) recovering the solid catalyst component According to the present invention, the solid catalyst component may also be prepared by a process comprising the steps of:
i) providing solid $MgCl_2$*mROH carrier, wherein m is 1 to 4 and R is a linear or branched alkyl group containing 1 to 8 C atoms
ii-1) adding the internal organic compound of formula (I) into the solid carrier of step i)
iii-1) pre-treating the solid carrier particles of step ii-1) with an Al compound iv-1) treating the pre-treated solid carried particles of step iii-1) with $TiCl_4$ and
v-1) recovering the solid catalyst component.

According to either one of the methods above the Al compound can be added to the solid carrier before or after adding the internal organic compound or simultaneously with the internal organic compound to the carrier.

Most preferably in the above-mentioned embodiments, m=2.7 to 3.3, ROH is ethanol, aluminum compound is an aluminum trialkyl compound, such as triethyl aluminum, and the internal organic compound is 2,2-di(2-tetrahydrofuryl)propane, or 2,2-di-(2-furan)-propane, especially 2,2-di(2-tetrahydrofuryl)propane or isomers or mixtures thereof.

According to the catalyst preparation method of the present invention, the pre-treatment with the Group 13 metal compound, preferably an aluminum compound, can be done by adding a solution of said aluminum compound in inert organic solvent, preferably in inert aliphatic hydrocarbon solvent, for example in heptane. The method of the invention allows using a concentrated aluminum compound solution. In the case where triethylaluminum (TEA) is used, a 15 to 100 wt % solution of TEA in an inert hydrocarbon, preferably a 25 to 100 wt % solution of TEA in inert aliphatic hydrocarbon solvent, like in heptane, can be used. It was found that by using these more concentrated solutions, the morphology remains advantageous and a reduced amount of waste is produced.

The final solid catalyst component typically has Mg/Ti mol/mol ratio of from 1 to 10, preferably from 2 to 8, especially from 3 to 7, Al/Ti mol/mol ratio of from 0.01 to 1, preferably from 0.1 to 0.5 and Cl/Ti mol/mol ratio of from 5 to 20, preferably from 10 to 17.

Particles of the solid catalyst component of the invention may be uniform in particle size without fines or agglomerates.

The supported catalyst component as described above allows the production of polymers with increased molecular weight. The increase in molecular weight is not made at the expense of productivity of the catalyst. The productivity remains at an acceptably high level or is even increased compared to use of a catalyst component of similar type but using a different internal organic compound and/or prepared by adding the internal organic compound during or after the treatment step with $TiCl_4$, or using said organic compound as external additive. Thus, the performance of the catalyst prepared by the method of the present invention makes it possible to broaden the preparation window of the polyethylene such that polymerization with both higher and lower amounts of hydrogen is possible while retaining good productivity.

The catalyst used in the process of the invention may in addition to the solid catalyst component as defined above comprise a cocatalyst, which is also known as an activator. Cocatalysts are organometallic compounds of Group 13 metal, typically aluminum compounds. These compounds include alkyl aluminum halides, preferably alkyl aluminum chlorides, such as ethylaluminum dichloride, diethylaluminum chloride, ethylaluminum sesquichloride, dimethylaluminum chloride and the like. They also include trialkylaluminum compounds, such as trimethylaluminum, triethylaluminum, tri-isobutylaluminum, trihexylaluminum and tri-noctylaluminum. Also other aluminum alkyl compounds, such as isoprenylaluminum, may be used. Especially preferred cocatalysts are trialkylaluminums, of which triethylaluminum, trimethylaluminum and tri-isobutylaluminum are particularlyused.

The catalyst of the invention may also comprise an external additive, like external donor. External additives that can be used include ether compounds, typically tetrahydrofuran, siloxane or silane type of external donors and/or alkyl halides as is known from prior art. The final solid catalyst component, i.e. the ZN solid catalyst component, obtained according to any one of the above described methods, is combined with an activator.

Suitable activators are optionally halogenated aluminum alkyl cocatalysts of formula $(C_1$-$C_4$-alkyl)p-Al—$X_{3-p}$, wherein X is chlorine, bromine, iodine or fluorine and p is 1, 2 or 3. The $C_1$-$C_4$-alkyl groups can be linear or branched or cyclic, or a mixture of such groups. X is preferably chlorine or bromine, most preferably X is chlorine.

Suitable activators are for example trimethyl aluminum (TMA), triethyl aluminum (TEA) dimethyl aluminum chloride (DMAC), diethyl aluminum chloride (DEAC), diisobutyl aluminum chloride (DIBAC), ethyl aluminum dichloride (EADC), methyl aluminum dichloride (MADC). A preferred activator used in the process of the invention is triethylaluminum.

The amount in which the activator is used depends on the specific catalyst and the activator. Typically triethylaluminum is used in such amount that the molar ratio of aluminum to the transition metal, like Al/Ti, is from 1 to 1000, preferably from 3 to 100 and in particular from about 5 to about 30 mol/mol.

Polymerization Process

The polymerization process comprise the first polymerization stage and the second polymerization stage. In addition, the process may comprise further polymerization stages, for instance, for producing one or more additional polymer components or for prepolymerizing the catalyst. The additional polymerization stages may precede or succeed either one of the first and the second polymerization stages. Furthermore, either one of the first and second polymerization stages may be divided into two or more steps wherein either the first homo- or copolymer of ethylene or the second copolymer of ethylene is produced in two or more steps, where each such step operates in conditions producing the respective first homo- or copolymer or second copolymer.

Prepolymerization

The polymerization steps may be preceded by a prepolymerization step. The purpose of prepolymerization is to polymerize a small amount of polymer onto the catalyst at a low temperature and/or a low monomer concentration. By prepolymerization it is possible to improve the performance of the catalyst in slurry and/or modify the properties of the final polymer. The prepolymerization step is conducted in slurry.

Thus, the prepolymerization step may be conducted in a loop reactor. The prepolymerization is then preferably conducted in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons.

The temperature in the prepolymerization step is typically from 0 to 90° C., preferably from 20 to 80° C. and more preferably from 55 to 75° C.

The pressure is not critical and is typically from 1 to 150 bar, preferably from 40 to 80 bar.

The amount of monomer is typically such that from about 0.1 to 1000 grams of monomer per one gram of solid catalyst component is polymerized in the prepolymerization step. As the person skilled in the art knows, the catalyst particles recovered from a continuous prepolymerization reactor do not all contain the same amount of prepolymer. Instead, each particle has its own characteristic amount which depends on the residence time of that particle in the prepolymerization reactor. As some particles remain in the reactor for a relatively long time and some for a relatively short time, then also the amount of prepolymer on different particles is different and some individual particles may contain an amount of prepolymer which is outside the above limits. However, the average amount of prepolymer on the catalyst typically is within the limits specified above.

The molecular weight of the prepolymer may be controlled by hydrogen as it is known in the art. Further, antistatic additive may be used to prevent the particles from adhering to each other or the walls of the reactor, as disclosed in WO-A-96/19503 and WO-A-96/32420.

The catalyst components are preferably all (separately or together) introduced to the prepolymerization step when a prepolymerization step is present. However, where the solid catalyst component and the cocatalyst can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein. Typically, the amounts of hydrogen and comonomer are adjusted so that the presence of the prepolymer has no effect on the properties of the final multimodal polymer. Especially, it is preferred that melt flow rate of the prepolymer is greater than the melt flow rate of the final polymer but smaller than the melt flow rate of the polymer produced in the first polymerization stage. It is further preferred that the density of the prepolymer is greater than the density of the final polymer. Preferably the density is approximately the same as or greater than the density of the polymer produced in the first polymerization stage. Further, typically the amount of the prepolymer is not more than about 5 wt % of the multimodal polymer comprising the prepolymer.

First Polymerization Stage

In the first polymerization stage a first homo- or copolymer of ethylene is produced. This is done by introducing a polymerization catalyst, optionally through the prepolymerization stage or a preceding polymerization stage as described above, into the first polymerization stage together with ethylene, hydrogen and optionally an alpha-olefin comonomer.

Hydrogen is introduced into the first polymerization stage for controlling the $MFR_2$ of the first homo- or copolymer of ethylene. The amount of hydrogen is such that the molar ratio of hydrogen to ethylene in the fluid reaction mixture is within the range of from 200 to 50000 mol/kmol (or mol/1000 mol), preferably of from 200 to 1000 mol/kmol. If the first polymerization stage is conducted as a slurry polymerization stage, preferably in a loop reactor, the molar ratio of hydrogen to ethylene in the fluid reaction mixture is preferably from 200 to 1000 mol/kmol, preferably from 300 to 800 mol/kmol.

The first homo- or copolymer of ethylene may be a homopolymer. Thus, the first alpha-olefin is not present in the first polymerization stage. Hydrogen is present in an amount described above. Further, the first homo- or copolymer of ethylene may be a copolymer of ethylene and the first alpha-olefin. In such a case, the molar ratio of the first alpha-olefin to ethylene in the fluid reaction mixture is from 100 to 1000 mol/kmol, preferably from 200 to 800 mol/kmol. The first alpha-olefin is preferably selected from the group consisting of 1-butene, 1-hexene and 4-methyl-1-pentene, more preferably consisting of 1-butene and 1-hexene. Also in this embodiment hydrogen is present in an amount as was described above.

When produced in the conditions as defined above, the first homo- or copolymer of ethylene typically has a melt flow rate $MFR_2$ of from 100 to 1000 g/10 min, preferably from 150 to 750 g/10 min and more preferably from 200 to 600 g/10 min. Furthermore, the first copolymer typically has a density of from 930 to 980 kg/m$^3$, preferably from 940 to 978 kg/m$^3$ and most preferably from 945 to 976 kg/m$^3$.

When the first homo- or copolymer of ethylene is a copolymer of ethylene, it then preferably has a density of from 930 to 955 kg/m$^3$, more preferably from 940 to 953 kg/m$^3$ and most preferably from 945 to 953 kg/m$^3$.

As the person skilled in the art is aware of, the $MFR_2$ and density ranges apply for the first homo- or copolymer of ethylene. If the first polymerization stage is preceded by another polymerization stage where a substantial amount of polymer is produced, then the above mentioned $MFR_2$ and density ranges given for the first homo- or copolymer do not necessarily apply for the polymer mixture comprising the polymers produced in the preceding polymerization stage and the first polymerization stage.

The first polymerization stage is preferably conducted as a slurry polymerization. The slurry polymerization usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amount of methane, ethane and/or butane.

The ethylene content in the fluid reaction mixture may be from 1 to about 50% by mole, preferably from about 2 to about 20% by mole and in particular from about 2 to about 10% by mole. The benefit of having a high ethylene concentration is that the productivity of the catalyst is increased but the drawback is that more ethylene then needs to be recycled than if the concentration was lower.

The temperature in the first polymerization stage is typically from 60 to 100° C., preferably from 70 to 95° C. An excessively high temperature should be avoided to prevent partial dissolution of the polymer into the diluent and the fouling of the reactor. The pressure is from 1 to 150 bar, preferably from 40 to 80 bar.

The slurry polymerization may be conducted in any known reactor used for slurry polymerization. Such reactors include a continuous stirred tank reactor and a loop reactor. It is especially preferred to conduct the polymerization in a loop reactor. In such reactors the slurry is circulated with a high velocity along a closed pipe by using a circulation pump. Loop reactors are generally known in the art and examples are given, for instance, in U.S. Pat. Nos. 4,582,816, 15 3,405,109, 3,324,093, EP-A-479186 and U.S. Pat. No. 5,391,654. It is thus preferred to conduct the first polymerization stage as a slurry polymerization in one or more loop reactors, more preferably in one loop reactor.

The slurry may be withdrawn from the reactor either continuously or intermittently. A preferred way of intermittent withdrawal is the use of settling legs where slurry is allowed to concentrate before withdrawing a batch of the concentrated slurry from the reactor. The use of settling legs is disclosed, among others, in U.S. Pat. Nos. 3,374,211, 3,242,150 and EP-A-1310295. Continuous withdrawal is disclosed, among others, in EP-A-891990, EP-A-1415999, EP-A-1591460 and WO-A-2007/025640. The continuous withdrawal is advantageously combined with a suitable concentration method, as disclosed in EP-A-20 1310295 and EP-A-1591460. It is preferred to withdraw the slurry from the first polymerization stage continuously.

If the first homo- or copolymer of ethylene is the first copolymer of ethylene, then the first alpha-olefin comonomer is introduced into the first polymerization stage for controlling density of the first copolymer of ethylene. The amount of comonomer needed to reach the desired density depends on the comonomer type, the catalyst used and the polymerization conditions, especially on $H_2/C_2$ ratio.

The contents of hydrogen, ethylene and the first alpha-olefin comonomer may be measured, as it is known in the art, by withdrawing a sample stream from the reactor or from the stream withdrawn from the reactor, as disclosed in WO-A-1996035936, WO-A-1994027134 and EP-A-460594. Preferably, such a sample stream is withdrawn from a pressure reduction stage, or flash, between the first and second polymerization stages.

The average residence time in the first polymerization stage is typically from 20 to 120 minutes, preferably from 20 to 70 minutes. As it is well known in the art, the average residence time r can be calculated from:

$$\tau = Vr/Qo$$

where Vr is the volume of the reaction space (in case of a loop reactor, the volume of the reactor, in case of the fluidized bed reactor, the volume of the fluidized bed) and Qo is the volumetric flow rate of the product stream (including the polymer product and the fluid reaction mixture).

It is possible, and occasionally preferred, to conduct the first polymerization stage in more than one step, for instance in two steps. When the first polymerization stage is conducted in more than one step, the first homo- or copolymer of ethylene is a mixture of two or more homo- or copolymers of ethylene. In such a case all such steps should be conducted in conditions as described above. Further, the amount of the first homo- or copolymer of ethylene is then the sum of the amounts of polymers produced in all such steps.

Furthermore, as described above, it is possible that one or more additional polymerization stages, where a polymer which is different from the first homo- or copolymer of ethylene is produced, precede the first polymerization stage.

Second Polymerization Stage

In the second polymerization stage, a polymer mixture comprising the first homo- or copolymer of ethylene and a second copolymer of ethylene is formed. This is done by introducing the particles of the first homo- or copolymer of ethylene, containing active catalyst dispersed therein, together with additional ethylene and a second alpha-olefin comonomer into the second polymerization stage. Hydrogen may be introduced for controlling the molecular weight. This causes the second copolymer of ethylene to form on the particles comprising the first homo- or copolymer of ethylene.

The ethylene copolymer may have an $MFR_5$ from 0.3 to 12.0 g/10 min. The ethylene copolymer may preferably have an $MFR_{21}$ of from 20 to 180 g/10 min, more preferably 25 to 100 g/10 min. Furthermore, it preferably has a flow rate ratio $FRR_{21/5}$ of from 10 to 50, more preferably from 15 to 40.

The second alpha-olefin comonomer is selected from alpha-olefins containing from 4 to 10 carbon atoms. The second alpha-olefin comonomer may be the same as or different from the first alpha-olefin comonomer, if the first alpha-olefin comonomer was present. In one preferred embodiment of the invention the first alpha-olefin comonomer and the second alpha-olefin comonomer are the same, such as 1-butene or 1-hexene, especially preferably 1-butene. In another preferred embodiment of the invention the first alpha-olefin comonomer is different from the second alpha-olefin comonomer. Then the first alpha-olefin comonomer can be 1-butene and the second alpha-olefin comonomer 1-hexene or 1-octene, more preferably 1-hexene. According to a further embodiment the first alpha-olefin comonomer is absent and the second alpha-olefin comonomer is 1-butene, 1-hexene or 1-octene, or their mixture, preferably 1-hexene.

The polymer mixture has a density of from 910 to 940 kg/m$^3$, more preferably from 915 to 930 kg/m$^3$ and most preferably from 918 to 927 kg/m$^3$.

The MFR$_{21}$ of the second copolymer of ethylene cannot be measured because the second copolymer cannot be isolated from the polymer mixture.

Hydrogen feed is adjusted to achieve a desired melt flow rate (or molecular weight) of the polymer mixture. Preferably, the hydrogen feed is controlled to maintain constant hydrogen to ethylene ratio in the fluid reaction mixture. The actual ratio depends on the catalyst as well as the type of the polymerization. The desired polymer properties have been obtained in gas phase polymerization in a fluidized bed reactor by maintaining the ratio in the gas phase within the range of from 10 to 200 mol/kmol, preferably from 50 to 200 mol/kmol, such as from 100 to 175 mol/kmol.

The second alpha-olefin comonomer is typically introduced to maintain a constant comonomer to ethylene ratio in the fluid reaction mixture. The comonomer to ethylene ratio that is needed to produce a polymer with the desired density depends, among others, on the type of comonomer and the type of catalyst. With 1-hexene as a comonomer, the desired polymer properties have been obtained in gas phase polymerization in a fluidized bed reactor with a molar ratio of 1-hexene to ethylene in the gas phase of from 50 to 400 mol/kmol, preferably from 100 to 250 mol/kmol and in particular from 120 to 220 mol/kmol.

Preferably, the second polymerization stage is conducted as a fluidized bed gas phase polymerization. In a fluidized bed gas phase reactor an olefin is polymerized in the presence of a polymerization catalyst in an upwards moving gas stream. The reactor typically contains a fluidized bed comprising the growing polymer particles containing the active catalyst located above a fluidization grid.

The polymer bed is fluidized with the help of fluidization gas comprising the olefin monomer, optionally comonomer(s), optionally chain growth controllers or chain transfer agents, such as hydrogen, and optionally inert gas. The fluidization gas is introduced into an inlet chamber at the bottom of the reactor. To make sure that the gas flow is uniformly distributed over the cross sectional surface area of the inlet chamber, the inlet pipe may be equipped with a flow dividing element as known in the art, e.g. U.S. Pat. No. 4,933,149 and EP-A-684871. One or more of the above mentioned components may be continuously added into the fluidization gas to compensate for losses caused, among other, by reaction or product withdrawal.

From the inlet chamber, the gas flow is passed upwards through a fluidization grid into the fluidized bed. The purpose of the fluidization grid is to divide the gas flow evenly through the cross-sectional area of the bed. Sometimes the fluidization grid may be arranged to establish a gas stream to sweep along the reactor walls, as disclosed in WO-A-2005/087361. Other types of fluidization grids are disclosed, among others, in U.S. Pat. No. 4,578,879, EP 600414 and EP-A-721798. An overview is given in Geldart and Bayens: The Design of Distributors for Gasfluidized Beds, Powder Technology, Vol. 42, 1985.

The fluidization gas passes through the fluidized bed. The superficial velocity of the fluidization gas must be greater that minimum fluidization velocity of the particles contained in the fluidized bed, as otherwise no fluidization would occur. On the other hand, the velocity of the gas should be lower than the onset velocity of pneumatic transport, as otherwise the whole bed would be entrained with the fluidization gas. The minimum fluidization velocity and the onset velocity of pneumatic transport can be calculated when the particle characteristics are known by using common engineering practice. An overview is given, among others, in Geldart: Gas Fluidization Technology, J. Wiley & Sons, 1986.

When the fluidization gas is contacted with the bed containing the active catalyst, the reactive components of the gas, such as monomers, comonomers and chain transfer agents, react in the presence of the catalyst to produce the polymer product. At the same time the gas is heated by the reaction heat.

The unreacted fluidization gas is removed from the top of the reactor and cooled in a heat exchanger to remove the heat of reaction. The gas is cooled to a temperature which is lower than that of the bed to prevent the bed from heating because of the reaction. It is possible to cool the gas to a temperature where a part of it condenses. When the liquid droplets enter the reaction zone they are vaporized. The vaporization heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerizable components, such as n-pentane, isopentane, n-butane or isobutane, which are at least partially condensed in the cooler.

The gas is then compressed and recycled into the inlet chamber of the reactor. Prior to the entry into the reactor, fresh reactants are introduced into the fluidization gas stream to compensate for the losses caused by the reaction and product withdrawal. It is generally known to analyze the composition of the fluidization gas and introduce the gas components to keep the composition constant. The actual composition is determined by the desired properties of the product and the catalyst used in the polymerization.

The catalyst may be introduced into the reactor in various ways, either continuously or intermittently. Among others, WO-A-01/05845 and EP-A-499759 disclose such methods. Where the gas phase reactor is a part of a reactor cascade, the catalyst is usually dispersed within the polymer particles from the preceding polymerization stage. The polymer particles may be introduced into the gas phase reactor as disclosed in EP-A-1415999 and WO-A-00/26258.

The polymeric product may be withdrawn from the gas phase reactor either continuously or intermittently. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

The top part of the gas phase reactor may include a so called disengagement zone. In such a zone the diameter of the reactor is increased to reduce the gas velocity and allow the particles that are carried from the bed with the fluidization gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain a time-averaged bed level.

Also, antistatic agent(s) may be introduced into the gas phase reactor if needed. Suitable antistatic agents and methods to use them are disclosed, among others, in U.S. Pat. Nos. 5,026,795, 4,803,251, 4,532,311, 4,855,370 and EP-A-560035. They are usually polar compounds and include, among others, water, ketones, aldehydes and alcohols.

The reactor may also include a mechanical agitator to further facilitate mixing within the fluidized bed. An example of suitable agitator design is given in EP-A-707513.

Typically, the fluidized bed polymerization reactor is operated at a temperature within the range of from 50 to 100° C., preferably from 65 to 90° C. The pressure is preferably from 10 to 40 bar, preferably from 15 to 30 bar.

The average residence time in the second polymerization stage is typically from 40 to 240 minutes, preferably from 60 to 180 minutes.

As discussed above, it is preferred to conduct the second polymerization stage in gas phase in one or more gas phase reactors, more preferably in one fluidized bed reactor.

The polymer mixture typically comprises from 25 to 57 wt % of the first homo- or copolymer and from 43 to 75 wt % of the second copolymer. Preferably, the polymer mixture comprises from 35 to 57 wt % of the first homo- or copolymer of ethylene and from 43 to 65 wt % of the second copolymer of ethylene. The polymer mixture may contain other polymers in addition to the first homo- or copolymer of ethylene and the second copolymer of ethylene but the contents of the first homo- or copolymer of ethylene and the second copolymer of ethylene must be within the above-mentioned limits.

Most preferably, the polymerization process of the present invention is conducted in a cascaded sequence comprising at least one loop reactor followed by at least one gas phase reactor.

Extrusion

When the polymer mixture has been removed from the polymerization reactor it is subjected to process steps for removing residual hydrocarbons from the polymer. Such processes are well known in the art and can include pressure reduction steps, purging steps, stripping steps, extraction steps and so on. Also, combinations of different steps are possible.

After the removal of residual hydrocarbons the polymer is preferably mixed with additives as it is well known in the art. Such additives include antioxidants, process stabilisers, neutralisers, lubricating agents, nucleating agents, pigments and so on.

According to the present invention, 0.1 to 5 wt % of carbon black may be added to the ethylene copolymer composition during extrusion, preferably 2 to 3 wt %. The carbon black is preferably a N220-type carbon black.

The polymer particles are mixed with additives and extruded to pellets as it is known in the art. Preferably, a counter-rotating twin screw extruder is used for the extrusion step.

Polymer Composition

The ethylene copolymer can be made according to the process as described above and according to all disclosed embodiments. The copolymer according to the present invention is a multimodal ethylene copolymer composition with a density of 920 and 949 kg/m³ and a flexural modulus, wherein the flexural modulus is following the equation:

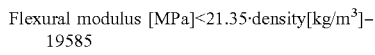

$$\text{Flexural modulus [MPa]} < 21.35 \cdot \text{density[kg/m}^3\text{]} - 19585 \qquad [1]$$

The ethylene copolymer is preferably a LLDPE. The ethylene copolymer is preferably produced in at least two polymerization stages, preferably in a continuously operating process.

The multimodal ethylene copolymer composition may comprise at least one alpha-olefin comonomer of $C_4$ to $C_{10}$, more preferably at least two alpha-olefin comonomer(s), even more preferably at least a first alpha-olefin comonomer comprising 1-hexene and a second alpha-olefin comonomer different from the first alpha-olefin comonomer. Preferably, the ethylene copolymer comprises at least 1-butene and 1-hexene comonomers.

The multimodal ethylene copolymer composition preferably comprises at least 80 wt % of the ethylene copolymer, more preferably at least 90 wt %.

The ethylene copolymer of the present invention may be produced with a Ziegler-Natta catalyst, preferably an internal organic compound having the formula compound having the formula (I):

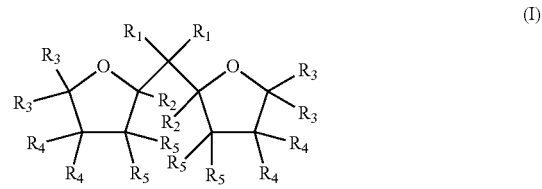

wherein in the formula (I) $R_1$ to $R_5$ are the same or different and can be hydrogen, a linear or branched $C_1$ to $C_8$-alkyl group, or a $C_3$-$C_8$-alkylene group, or two or more of $R_1$ to $R_5$ can form a ring, and the two oxygen-containing rings are individually saturated or partially unsaturated or unsaturated.

The $MFR_2$ of the multimodal ethylene copolymer composition may be 0.1 to 4 g/10 min, preferably 0.5 to 2 g/10 min and most preferably 0.7 to 1.5 g/10 min.

The $MFR_5$ of the multimodal ethylene copolymer composition may be 0.3 to 12 g/10 min, more preferably 2 to 7 g/10 min and most preferably 2 to 5 g/10 min.

The $MFR_{21}$ of the multimodal ethylene copolymer composition may be 20 to 180 g/10 min, more preferably 40 to 120 g/10 min and most preferably 60 to 100 g/10 min.

The $FRR_{21/5}$ of the multimodal ethylene copolymer composition may be 10 to 50, more preferably 15 to 40.

The Shore D (1s) of the multimodal ethylene copolymer composition may be at least 50, more preferably at least 53. The higher the Shore D (1s) is, the more resistant is the surface of the multimodal ethylene copolymer composition towards mechanical impact.

The multimodal ethylene copolymer composition according to the present invention may have the flexural modulus following the equation:

$$\text{Flexural modulus [MPa]} < 21.35 * \text{density[kg/m}^3\text{]} - 19610 \quad [2]$$

The multimodal ethylene copolymer composition preferably may have a density of 930 to 949 kg/m³, preferably 930 to 940 kg/m³. One object of the invention is the ability to minimize density, thus increasing flexibility, while maintaining the Shore D (1s).

Carbon black may be added to the multimodal ethylene copolymer composition, preferably 0.1 to 5 wt % of carbon, more preferably 0.5 to 3 wt %, most preferably 1 to 3 wt %. The carbon black is preferably a UV carbon black, such as a N220-type carbon black. The carbon black can either be added during extrusion right after polymerization reactor or in a separate step. The carbon black can also be added by a carbon black masterbatch directly to the cable jacket extruder. The $MFR_2$, $MFR_5$, $MFR_{21}$ and the FRR are almost unchanged by the added carbon black.

The multimodal ethylene copolymer composition of the present invention may further comprise conventional additives such as antioxidants, pigments, UV additives and process aids, typically in an amount of 0.1 wt % to 5 wt %.

The multimodal ethylene copolymer composition according to the present invention may be produced in at least two polymerization stages.

The invention also relates to a cable jacket comprising the multimodal ethylene copolymer composition according to the disclosure above.

The invention further relates to a power cable or communication cable comprising the cable jacket comprising the multimodal ethylene copolymer composition, preferably to a power cable comprising an inner semiconducting layer, followed by an insulating layer, and then an outer semiconducting layer. The cable jacket preferably consists of the multimodal ethylene copolymer composition of the present invention.

DETAILED DESCRIPTION OF THE INVENTION

Test Methods
Melt Flow Rate

Melt flow rate (MFR) was determined according to ISO 1133 at 190° C. The load under which the measurement is conducted is given as a subscript. Thus, the MFR under the load of 2.16 kg is denoted as $MFR_2$. The melt flow rate $MFR_{21}$ is correspondingly determined at 190° C. under a load of 21.6 kg and $MFR_5$ under a load of 5 kg.

Density

Density of the polymer was measured according to ISO 1183-1:2004 Method A on compression moulded specimen prepared according to EN ISO 1872-2 (February 2007) and is given in kg/m³.

Reactor Gas Composition

Reactor gas composition in a slurry reactor can be measured, as is well known in the art, from the flash gas after the reactor by using on-line gas chromatography, as disclosed, for instance, in WO-A-1996035936.

Reactor gas composition in a gas phase reactor can be analyzed from the circulation gas by using on-line chromatography, as it is well known in the art.

The instruments are calibrated, as it is known in the art, with calibration gas mixtures having a known composition which is close to that of the gas mixture present in the polymerization process.

Flexural Test (Modulus)

Flexural modulus reflects the flexibility of a material. The higher the flexural modulus, the lower the flexibility of a material, i.e. the material is more difficult to deform under a given load.

The flexural test was carried out according to the method of ISO 178 by using compression molded test specimens produced according to EN ISO 1872-2.

A rectangular specimen of size 80×4×10 mm was placed between two supports. The specimen was then pressed down with a loading edge placed in the middle of the specimen with the speed of 2 mm/min. In this case, only the flexural modulus was investigated and thus the flexural strain was measured between 0.05% and 0.25% on which the flexural modulus was calculated.

Tensile Test (Strength)

Tensile test was measured according to ISO 527.

Crosshead speed for testing the tensile strength and elongations was 50 mm/min.

Test specimen produced as described in EN ISO 1872-2, specimen type: 5A to ISO 527-2 were used.

Shore D

Shore D (1s) is determined according to ISO868 on moulded specimen with a thickness of 4 mm. The shore hardness is determined after 1 sec after the pressure foot is in firm contact with the test specimen. The specimen was moulded according to EN ISO1872-2.

Quantification of Microstructure by NMR Spectroscopy

Quantitative nuclear-magnetic resonance (NMR) spectroscopy was used to quantify the comonomer content of the polymers. Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimized 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification {klimke06, parkinson07, castignolles09}. Standard single-pulse excitation was employed utilizing the NOE at short recycle delays {pollard04, klimke06} and the RS-HEPT decoupling scheme {fillip05, griffin07}. A total of 1024 (1 k) transients were acquired per spectra.

Quantitative $^{13}C\{^1H\}$ NMR spectra were processed, integrated and relevant quantitative properties determined from the integrals. All chemical shifts are internally referenced to the bulk methylene signal (δ+) at 30.00 ppm {randall89}.

The amount of ethylene was quantified using the integral of the methylene (δ+) sites at 30.00 ppm accounting for the number of reporting sites per monomer:

$$E = I_{\delta+}/2$$

The presence of isolated comonomer units is corrected for based on the number of isolated comonomer units present:

$$E\text{total} = E + (3 \cdot B + 2 \cdot H)/2$$

where B and H are defined for their respective comonomers. Correction for consecutive and non-consecutive comonomer incorporation, when present, is undertaken in a similar way.

Characteristic signals corresponding to the incorporation of 1-butene were observed and the comonomer fraction was calculated as the fraction of 1-butene in the polymer with respect to all monomer in the polymer:

$fBtotal=Btotal/(Etotal+Btotal+Htotal)$

The amount isolated 1-butene incorporated in EEBEE sequences was quantified using the integral of the *B2 sites at 38.3 ppm accounting for the number of reporting sites per comonomer:

$B=I_{*B2}$

The amount of consecutively incorporated 1-butene in EEBBEE sequences was quantified using the integral of the $\alpha\alpha B2B2$ site at 39.4 ppm accounting for the number of reporting sites per comonomer:

$BB=2 \cdot I_{\alpha\alpha B2B2}$

The amount of non-consecutively incorporated 1-butene in EEBEBEE sequences was quantified using the integral of the $\beta\beta B2B2$ site at 24.7 ppm accounting for the number of reporting sites per comonomer:

Due to the overlap of *B2 and $\beta\beta B2B2$ sites of isolated (EEBEE) and non-consecutively incorporated (EEBEBEE) 1-butene respectively the total amount of isolated 1-butene incorporation is corrected based on the amount of non-consecutive 1-butene present:

$B=I_{*B2}-2 \cdot I_{\beta\beta B2B2}$

The total 1-butene content was calculated based on the sum of isolated, consecutively and non-consecutively incorporated 1-butene:

$Btotal=B+BB+BEB$

The total mole fraction of 1-butene in the polymer was then calculated as:

$fB=Btotal/(Etotal+Btotal+Htotal)$

Characteristic signals corresponding to the incorporation of 1-hexene were observed and the comonomer fraction calculated as the fraction of 1-hexene in the polymer with respect to all monomer in the polymer:

$fHtotal=Htotal/(Etotal+Btotal+Htotal)$

The amount isolated 1-hexene incorporated in EEHEE sequences was quantified using the integral of the *B4 sites at 39.9 ppm accounting for the number of reporting sites per comonomer:

$H=I_{*B4}$

The amount of consecutively incorporated 1-hexene in EEHHEE sequences was quantified using the integral of the $\alpha\alpha B4B4$ site at 40.5 ppm accounting for the number of reporting sites per comonomer:

$HH=2 \cdot I_{\alpha\alpha B4B4}$

The amount of non-consecutively incorporated 1-hexene in EEHEHEE sequences was quantified using the integral of the $\beta\beta B4B4$ site at 24.7 ppm accounting for the number of reporting sites per comonomer:

$HEH=2 \cdot I_{\beta\beta B4B4}$

The total mole fraction of 1-hexene in the polymer was then calculated as:

$fH=Htotal/(Etotal+Btotal+Htotal)$

The mole percent comonomer incorporation is calculated from the mole fraction:

$B[\text{mol \%}]=100 \cdot fB$ $H[\text{mol \%}]=100 \cdot fH$

The weight percent comonomer incorporation is calculated from the mole fraction:

$B[\text{wt \%}]=100 \cdot (fB \cdot 56.11)/((fB \cdot 56.11)+(fH \cdot 84.16)+((1-(fB+fH)) \cdot 28.05))$ $H[\text{wt \%}]=100 \cdot (fH \cdot 84.16)/((fB \cdot 56.11)+(fH \cdot 84.16)+((1-(fB+fH)) \cdot 28.05))$

REFERENCES klimke06
Klimke, K., Parkinson, M., Piel, C., Kaminsky, W., Spiess, H. W., Wilhelm, M., Macromol. Chem. Phys. 2006; 207:382.
parkinson07
Parkinson, M., Klimke, K., Spiess, H. W., Wilhelm, M., Macromol. Chem. Phys. 2007; 208:2128.
pollard04
Pollard, M., Klimke, K., Graf, R., Spiess, H. W., Wilhelm, M., Sperber, O., Piel, C., Kaminsky, W., Macromolecules 2004; 37:813.
filip05
Filip, X., Tripon, C., Filip, C., J. Mag. Resn. 2005, 176, 239
griffin07
Griffin, J. M., Tripon, C., Samoson, A., Filip, C., and Brown, S. P., Mag. Res. in Chem. 2007 45, S1, S198
castignolles09
Castignolles, P., Graf, R., Parkinson, M., Wilhelm, M., Gaborieau, M., Polymer 50 (2009) 2373
busico01
Busico, V., Cipullo, R., Prog. Polym. Sci. 26 (2001) 443
busico97
Busico, V., Cipullo, R., Monaco, G., Vacatello, M., Segre, A. L., Macromoleucles 30 (1997) 6251
zhou07
Zhou, Z., Kuemmerle, R., Qiu, X., Redwine, D., Cong, R., Taha, A., Baugh, D. Winniford, B., J. Mag. Reson. 187 (2007) 225
busico07
Busico, V., Carbonniere, P., Cipullo, R., Pellecchia, R., Severn, J., Talarico, G., Macromol. Rapid Commun. 2007, 28, 1128
resconi00
Resconi, L., Cavallo, L., Fait, A., Piemontesi, F., Chem. Rev. 2000, 100, 1253
Materials
Catalyst 1
Complex Preparation Toluene (87 kg) was added into a 100 liter reactor. Then Bomag A, provided by Chemtura, (45.5 kg, 20 wt % butyloctyl magnesium in heptane) was added to the reactor. Then 2-ethyl-1-hexanol (161 kg, 99.8 wt %) was introduced into the reactor at a flow rate of 24-40 kg/h. The molar ratio between BOMAG-A and 2-ethyl-1-hexanol was 1:1.83.
Solid Catalyst Component Preparation 10 275 kg silica (ES747JR of Crossfield, having average particle size of 20 μm) activated at 600° C. in nitrogen was charged into a catalyst preparation reactor. Then, 411 kg 20% EADC (2.0 mmol/g silica) diluted in 555 litres pentane was added into the reactor at ambient temperature during one hour. The temperature was then increased to 35° C. while stirring the treated silica for one hour. The silica was dried at 50° C. for 8.5 hours. Then 655 kg of the complex prepared as described above (2 mmol Mg/g silica) was added at 23° C. during ten minutes. 86 kg pentane was added into the reactor at 22° C. during ten minutes. The slurry was stirred for 8 hours at 50° C. Finally, 52 kg TiCl$_4$ was added during 0.5 hours at 45° C. The slurry was stirred at 40° C. for five hours. The catalyst was then dried by purging with nitrogen.

Catalyst 2

Preparation of Pre-Treated Support Material

A jacketed 160 dm$^3$ stainless steel reactor equipped with a helical mixing element was pressurized with N$_2$ to 2.0 barg and depressurized down to 0.2 barg until the O$_2$ level was less than 3 ppm. The vessel was then charged with heptane (20.5 kg) and 2,2-di(tetrahydrofuryl)propane (0.512 kg; 79 mol; DTHFP). The obtained mixture was stirred for 20 min at 40 rpm. The MgCl$_2$.3EtOH carrier (6.5 kg; DTHFP/Mg=0.1 mol/mol; 27.2 mol of Mg; Mg 10.18 wt %, d10=9.5 µm, d50=17.3 µm and d90=28.5 µm, granular shaped) was added to the reactor with stirring. This suspension was cooled to approximately −20° C. and 33 wt % solution of triethylaluminum (29.4 kg, 85.0 mol of Al; Al/EtOH=1.0 mol/mol) in heptane was added in aliquots during 2.5 h time while keeping the temperature below 10° C. After the TEA addition, the reaction mixture was gradually heated to 80° C. over a period of 2.4 h and kept at this temperature for additional 20 min at 40 rpm. The suspension was allowed to settle for 10 min, and the mother liquor was removed through a 10 µm filter net in the bottom of the reactor during 15 min. The vessel was charged with warm toluene (43 kg) and then stirred at 40 rpm for 38 min at 55 to 70° C. The suspension was allowed to settle for 10 min at 50 to 55° C. and the liquid removed through a 10 µm filter net in the bottom of the reactor during 15 min.

Catalyst Preparation

The vessel containing the pre-treated support material was charged with toluene (43 kg) and then cooled to approximately 30° C. Neat TiCl$_4$ (5.17 kg, 27.5 mol; Ti/Mg=1.0 mol/mol) was added. The obtained suspension was heated to approximately 90° C. over a period of 2 h and kept at this temperature for one additional hour with stirring at 40 rpm. The suspension was allowed to settle for 10 min at approximately 90° C. and the mother liquor was removed through a 10 µm filter net in the bottom of the reactor during 15 min. The obtained solid material was washed twice with toluene (43 kg each) at ~90° C. and once with heptane (34 kg) at ~40° C. All three of these washing steps used the same sequence of events: addition of preheated (90 or 40° C.) solvent, then stirring at 40 rpm for 30 min, allowing the solid to settle for 10 min, and then removal of liquid through a 10 µm filter net in the bottom of the reactor during 15 min.

The obtained catalyst was mixed with 20 kg of white oil and dried 4 h at 40-50° C. with nitrogen flow (2 kg/h) and vacuum (−1 barg). The catalyst was taken out from the reactor and the reactor was flushed with another 20 kg of oil and taken out to the same drum. The dry catalyst yield was 3.60 kg (82.2% based on Mg).

Polymerization

Inventive Examples

A loop reactor having a volume of 50 dm$^3$ was operated at a temperature of 60° C. and a pressure of 58 bar. Into the reactor were fed ethylene, 1-butene, propane diluent and hydrogen so that the feed rate of ethylene was 4.0 kg/h, feed rate of 1-butene was 50 g/h, feed rate of hydrogen was 10 g/h and feed rate of propane was 52 kg/h. Also, 3 g/h of a solid polymerization catalyst component produced as described above in chapter "Catalyst Preparation" was introduced into the reactor together with triethylaluminum cocatalyst so that the molar ratio of Al/Ti was about 15. The estimated production rate was 3.8 kg/h.

A stream of slurry from the reactor was withdrawn intermittently and directed into a loop reactor having a volume of 350 dm$^3$, which was operated at 85° C. temperature and 56 bar pressure. Into the reactor was further added a fresh propane feed of 116 kg/h, ethylene and hydrogen so that the ethylene content in the fluid reaction mixture was 3.8 mol % and the molar ratio of hydrogen to ethylene was 500 mol/kmol. The ethylene copolymer withdrawn from the reactor had MFR$_2$ of 300 g/10 min and density of 972 kg/m$^3$. The production rate was 38 kg/h.

The slurry was withdrawn from the loop reactor intermittently and directed to a flash vessel operated at a temperature of 50° C. and a pressure of 3 bar. From there the polymer was directed to a fluidized bed gas phase reactor operated at a pressure of 20 bar and a temperature of 75° C. Additional ethylene, 1-hexene comonomer, nitrogen as inert gas and hydrogen were added so that the ethylene content in the fluid reaction mixture was 20 mol %, the ratio of hydrogen to ethylene was 150 mol/kmol and the molar ratio of 1-hexene to ethylene was 210 mol/kmol. The polymer production rate in the gas phase reactor was 55 kg/h and thus the total polymer withdrawal rate from the gas phase reactor was about 97 kg/h. The polymer had a melt flow rate MFR$_5$ of 3.0 g/10 min and a density of 920 kg/m$^3$. The production split (wt % prepolymer/wt % 1st stage component/wt % 2nd stage component) was 4/44/52.

The polymer powder was compounded and pelletized with 0.2 wt % Irganox B 141, 6.6 wt % carbon black masterbatch based on LDPE (MFR190° C./2.16 kg=2 g/10 min), containing ~40% N220-type carbon black, 0.1 wt % Irganox B 225 FF and 0.05 wt % calcium stearate.

The procedure of Inventive Example 1 was repeated with the conditions as shown in Table 1.

TABLE 1

Pilot production data

| | | Comparative Example CE | Inventive Example IE1 | Inventive Example IE2 |
|---|---|---|---|---|
| | Catalyst type | Catalyst 1 | Catalyst 2 | Catalyst 2 |
| Pre-poly | A1 Temperature° C. | 70 | 60 | 60 |
| | A1 Ethylene feed (kg/h) | 2 | 4 | 4 |
| | A1 1-butene feed (kg/h) | 0.108 | 0.05 | 0.05 |
| | A1 Hydrogen feed (g/h) | 4.7 | 9.9 | 9.9 |
| | A1 Production rate (kg/h) | 1.9 | 3.8 | 3.8 |
| Loop (A2) | A2 Temperature (° C.) | 85 | 85 | 85 |
| | A2 H2/C2 ratio (mol/kmol) | 267.2 | 521 | 506.9 |
| | A2 C4/C2 ratio (mol/kmol) | 600 | 677 | 689.4 |
| | A2 Density | 948.3 | 949.2 | 949.1 |
| | A2 MFR$_2$ (g/10 min) | 323 | 320 | 304 |
| GPR (A3) | A3 Temperature (° C.) | 75 | 75 | 75 |
| | A3 H2/C2 ratio (mol/kmol) | 30 | 142 | 152 |
| | A3 C6/C2 ratio (mol/kmol) | | 212 | 214 |
| | A3 C4/C2 ratio (mol/kmol) | 668 | | |
| | A3 split wt % | 55.5 | 56.6 | 56.9 |
| | A3 Density (kg/m$^3$) | 922.3 | 921.3 | 919.9 |
| | A3 MFR$_2$ (g/10 min) | 0.83 | 0.76 | 0.83 |
| | A3 MFR$_5$ (g/10 min) | 3.1 | 3.0 | 3.0 |
| | A3 MFR$_{21}$ (g/10 min) | 65 | 62 | 64 |
| Mixer powder | Mixer density (kg/m$^3$) | 923.1 | 925.3 | 924.2 |
| | Mixer MFR$_2$ (g/10 min) | 0.72 | 0.72 | na |
| | Mixer MFR$_5$ (g/10 min) | 2.9 | 2.9 | 2.9 |
| | Mixer MFR$_{21}$ (g/10 min) | 58 | 62 | 50 |

IE1 and IE2 are made with catalyst 2. CE is made with Catalyst 1. CE is produced with similar process properties and has a significantly higher flexibility in relation to IE1 and IE2.

IE1, IE2 and CE are produced as described above in pilot scale compared to a commercial reference LE8707, which is available from Borealis AG, produced in a large scale plant. The comparative example CE is made to be as close as possible to the commercial reference in selection of process parameter and selection of catalyst. It can be seen that the pilot scale material (CE) is significantly less flexible compared to the commercial product. This indicated that the invention will work even better in large scale plants.

Table 2 compares the IE1, IE2 and CE with LE8707. Both IE1 and IE2 have lower flexural modulus than LE8707 but comparable hardness.

TABLE 2

Summary of analytics and tests of the final material

|  | Unit | LE8707 (comparative commercial) | Comparative example (CE) | Inventive Example 1 (IE1) | Inventive Example 2 (IE2) |
| --- | --- | --- | --- | --- | --- |
| Flexural modulus | MPa | 400 | 473 | 348 | 337 |
| Final Density | kg/m³ | 936 | 936.1 | 937.4 | 934.7 |
| MFR$_2$ | g/10 min | 0.85 | 0.72 | 0.71 | 0.81 |
| MFR$_5$ | g/10 min | na | 2.7 | 2.7 | 3.1 |
| MFR$_{21}$ | g/10 min | 65 | 54 | 69 | 62 |
| FRR 21.6/2.16 |  | 75 | 76 | 96 | 77 |
| Tensile strain at break | % | 800 | 729 | 730 | 740 |
| Tensile stress at break | MPa | 30 | 22.8 | 26.9 | 27.5 |
| Shore D (1s) |  | 54 | 50.1 | 54.4 | 56.8 |
| C4 content | Mol % | 3.6 | 3.9 | 0.5 | 0.6 |
| C6 content | Mol % | 0 | 0 | 2.6 | 2.8 |

As can be seen in the Table 2, comparative examples and inventive examples have similar densities. Surprisingly, it can be seen that the flexibility of the inventive examples is considerably higher than the comparative example, while Shore D hardness has increased. Other properties are in similar range as the comparative example.

FIG. 1 shows flexural modulus as a function of density. As may be seen in FIG. 1, the inventive examples IE1 and IE2 follows the equation as described above, i.e.

$$\text{Flexural modulus [MPa]} < 21.35 \cdot \text{density[kg/m}^3\text{]} - 19585$$

Although the present invention has been described with reference to various embodiments, those skilled in the art will recognize that changes may be made without departing from the scope of the invention. It is intended that the detailed description be regarded as illustrative, and that the appended claims including all the equivalents are intended to define the scope of the invention.

What is claimed is:

1. A multimodal ethylene copolymer composition comprising an ethylene copolymer having a density of 930 to 949 kg/m³, measured according to ISO 1183-1:2004 Method A on compression, molded specimen prepared according to EN ISO 1872-2 (February 2007), obtainable by a process comprising a first polymerization stage, wherein a first copolymer is produced from ethylene and an alpha-olefin comonomer, and a second polymerization stage, wherein a second copolymer is produced from ethylene and an alpha-olefin comonomer, said multimodal ethylene copolymer composition comprising at least two alpha-olefin comonomers selected from 1-butene and 1-hexene and a flexural modulus, wherein said flexural modulus is measured according to the method of ISO 178 by using compression molded test specimens produced according to EN ISO 1872-2, and wherein numerical values of said flexural modulus, in MPa, and density, in kg/m³ follow the inequality:

$$\text{Flexural modulus [MPa]} < 21.35 \cdot \text{density [kg/m}^3\text{]} - 19585 \quad [1],$$

wherein the Flexural modulus is at least 245.5 MPa, and wherein the Shore D (1s) of the multimodal ethylene copolymer composition, as measured according to ISO868 on specimen molded according to EN ISO 1872-2, is at least 53.

2. The multimodal ethylene copolymer composition according to claim 1, wherein said ethylene copolymer is produced with a Ziegler-Natta catalyst.

3. The multimodal ethylene copolymer composition according to claim 1, wherein said multimodal ethylene copolymer composition has MFR$_2$ of 0.1 to 4 g/10 min.

4. The multimodal ethylene copolymer composition according to claim wherein said multimodal ethylene copolymer composition has MFR$_5$ of 0.3 to 12 g/10 min.

5. The multimodal ethylene copolymer composition according to claim 1, wherein said multimodal ethylene copolymer composition has MFR$_{21}$ of 20 to 180 g/10 min.

6. The multimodal ethylene, copolymer composition according to claim 1, wherein the flexural modulus is following the inequality:

$$\text{Flexural modulus [MPa]} < 21.35 \cdot \text{density [kg/m}^3\text{]} - 19610 \quad [2].$$

7. The multimodal ethylene copolymer composition according to claim 1, wherein the density of said multimodal ethylene copolymer composition is 930 to 940 kg/m³.

8. The multimodal ethylene polymer composition according to claim 1, wherein said multimodal ethylene copolymer composition further comprises carbon black.

9. A cable jacket comprising a multimodal ethylene copolymer composition comprising an ethylene copolymer having a density of 930 to 949 kg/m³, measured according to ISO 1183-1:2004 Method A on compression molded specimen prepared according to EN ISO 1872-2 (February 2007), obtainable by a process comprising a first polymerization stage, wherein a first copolymer is produced from ethylene and an alpha-olefin comonomer, and a second polymerization stage, wherein a second copolymer is produced from ethylene and an alpha-olefin comonomer, said multimodal ethylene copolymer composition comprising at least two alpha-olefin comonomers selected from 1-butene and 1-hexene and a flexural modulus, measured according to the method of ISO 178 by using compression molded test specimens produced according to EN ISO 1872-2, and wherein numerical values of said flexural modulus, in MPa, and density, in kg/m³ follow the inequality:

$$\text{Flexural modulus [MPa]} < 21.35 \cdot \text{density [kg/m}^3\text{]} - 19585 \quad [1],$$

wherein the Flexural modulus is at least 245.5 MPa, and
wherein the Shore D (1s) of the multimodal ethylene copolymer composition, as measured according to ISO868 on specimen moulded according to EN ISO 1872-2, is at least 53.

10. The cable jacket according to claim 9, wherein said multimodal ethylene copolymer is produced with a Ziegler-Natta catalyst.

11. The cable jacket according to claim 9, wherein said multimodal ethylene copolymer composition has $MFR_2$ of 0.1 to 4 g/10 min.

12. The cable jacket according to claim 9, wherein said multimodal ethylene copolymer composition has $MFR_5$ of 0.3 to 12 g/10 min.

13. The cable jacket according to claim 9, wherein said multimodal ethylene copolymer composition has $MFR_{21}$ of 20 to 180 g/10 min.

* * * * *